No. 827,519. PATENTED JULY 31, 1906.
E. A. EMERY.
METHOD OF LUBRICATING PNEUMATIC MACHINERY.
APPLICATION FILED AUG. 22, 1903. RENEWED MAY 19, 1906.
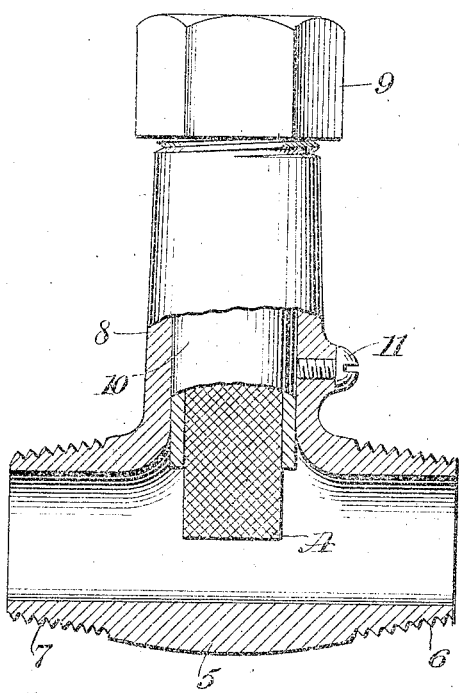
WITNESSES:
H. Walker
INVENTOR
Edwin A. Emery
BY
ATTORNEYS

UNITED STATES PATENT OFFICE.

EDWIN A. EMERY, OF CRIPPLE CREEK, COLORADO, ASSIGNOR TO THE EMERY PNEUMATIC LUBRICATOR COMPANY.

METHOD OF LUBRICATING PNEUMATIC MACHINERY.

No. 827,519.

Specification of Letters Patent.

Patented July 31, 1906.

Application filed August 22, 1903. Renewed May 19, 1906. Serial No. 317,795.

*To all whom it may concern:*

Be it known that I, EDWIN A. EMERY, a citizen of the United States, and a resident of Cripple Creek, in the county of Teller and State of Colorado, have invented a new and Improved Method of Lubricating Pneumatic Machinery, of which the following is a full, clear, and exact description.

One of the problems involved in the practical operation of pneumatic machinery is the lubrication of the surfaces of the working parts exposed more or less to atmospheric pressure. Lubricants of a liquid nature cannot be advantageously employed owing to the tendency of the air-pressure to displace the liquid, the result being that the lubricant is wasted and the surfaces are insufficiently lubricated.

In the present invention I employ a lubricant of a solid nature and utilize a current of compressed air as the vehicle by which the lubricant is carried to the surfaces which it is desired to lubricate. In the course of extended experiments I have discovered that the most potent factor in dissolving a charge of solid or pressed lubricant is the action of the moisture present in the current of compressed air on the charge, and in practicing my invention I therefore place the lubricant charge in such proximity to the path of the current that the moisture contained therein will have access to the lubricant in such a way as to dissolve the latter gradually and slowly. The lubricating solution thus formed is conveyed in the air-current to the surfaces of the machinery.

Further objects and advantages of the invention will appear in the course of the subjoined description, and the actual scope thereof will be defined by the annexed claims.

Reference is to be had to the accompanying drawing, forming a part of this specification, in which the figure represents a vertical sectional elevation through one form of apparatus suitable for carrying my process into effect.

In the apparatus shown I employ a casing 5, having threaded nipples 6 7 for the attachment of pipes adapted to carry a current of compressed air to and from the lubricating device. This casing is also provided with a laterally-extending member 8, which is closed at its outer extremity by a suitable cap 9. The member 8 of the casing is adapted to contain a holder 10, which may be clamped at any desired point of adjustment within said casing member by a suitable form of clamp, such as the set-screw 11. This holder 10 carries or sustains a charge of solid lubricant, such as A, and the holder is adapted to present the lubricant in a position where it is exposed to access by the moisture present in a current of compressed air which traverses the casing 5 of the lubricator.

It will be understood that I do not limit myself to the employment of any particular form of apparatus for carrying the process into effect nor to the location of the lubricator device at any particular point in the path or adjacent to the path of said air-current. In some cases it is sufficient to place the lubricant charge in a trap adjacent to the path of the air-current, so that the moisture present in the air will be trapped into contact with the lubricant charge. I have found that a trapped arrangement of the charge is sufficient in some cases to supply the necessary volume of dissolved lubricant to the air-current, particularly where it is not desirable to economize in the consumption of the lubricant charge.

In many cases it is sufficient to place the charge A in a position wherein it is exposed to access by the air without interposing said charge directly in the path of the air-current, and thereby subjecting it to mechanical abrasion due to the impact of the swiftly-moving current of air directly on the solid charge.

Having thus described my invention, I claim as new and desire to secure by Letters Patent—

1. The method of lubricating pneumatic machinery, which consists in dissolving a lubricant by a current of compressed air, and conveying the dissolved lubricant by such current to the surfaces to be lubricated.

2. The method of lubricating pneumatic machinery, which consists in exposing a lubricating charge to the action of moisture present in a current of compressed air, the dissolved lubricant being carried by the air-current to the surfaces it is desired to lubricate.

3. The method of lubricating pneumatic machinery, which consists in subjecting a lubricating charge to the combined disintegrating and dissolving action of an air-current and the moisture present therein, the air-current being the vehicle by which the dissolved lubricant is conveyed to the surfaces to be lubricated.

4. The method of lubricating pneumatic machinery, which consists in interposing a lubricant charge in the path of an air-current; dissolving the charge by the action of the current; and conveying the dissolved charge to the surfaces it is desired to lubricate.

5. The method of lubricating pneumatic machinery, which consists in dissolving a charge of solid lubricant by the moisture present in a current of compressed air, suspending the particles of dissolved lubricant mechanically in the current, and utilizing the current as a vehicle for carrying the lubricant to the surfaces it is desired to lubricate.

In testimony whereof I have signed my name to this specification in the presence of two subscribing witnesses.

EDWIN A. EMERY.

Witnesses:
L. H. BOURNE,
W. C. CALHOUN.